United States Patent Office 3,355,249
Patented Nov. 28, 1967

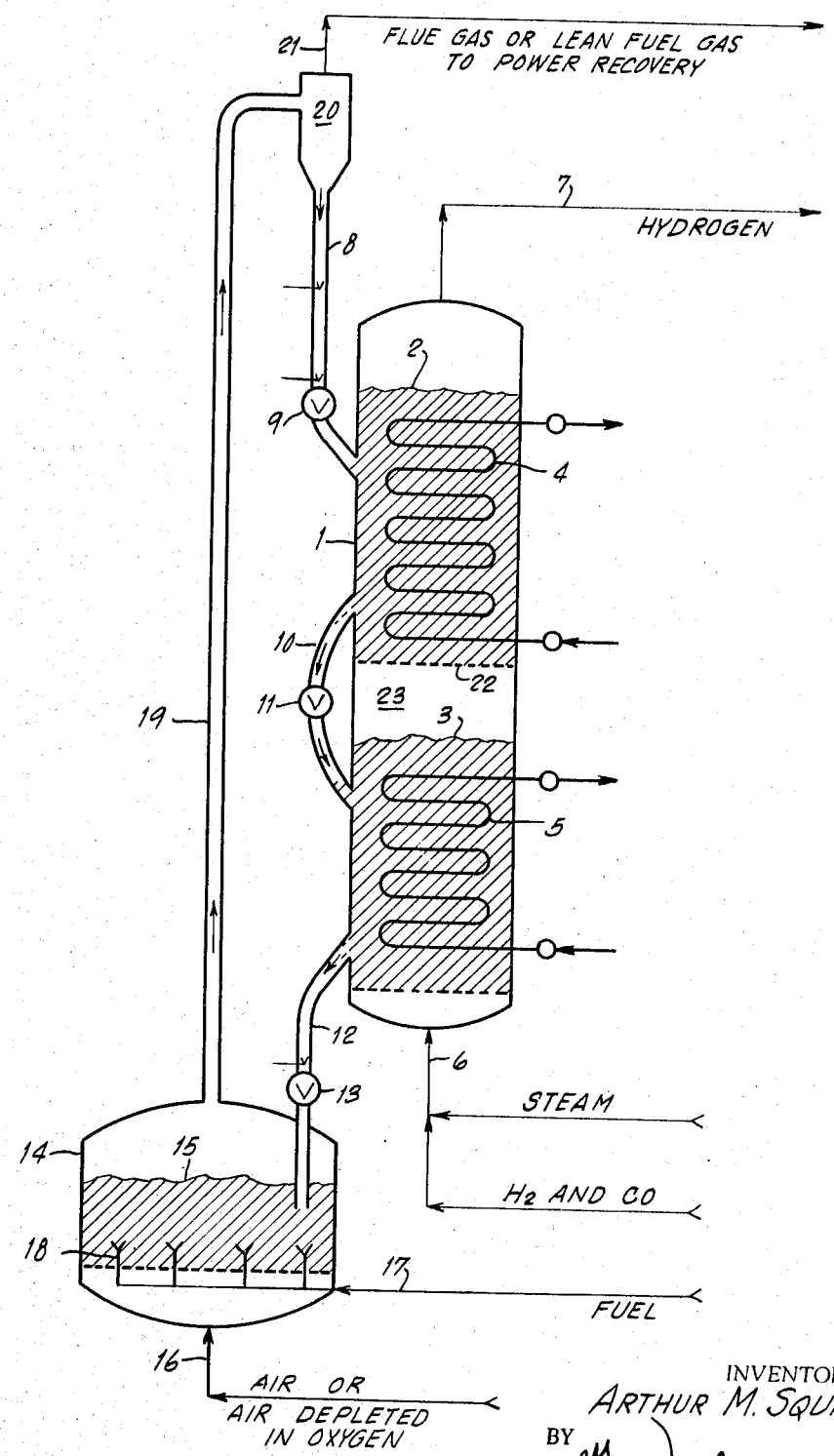

3,355,249
PRODUCING HYDROGEN AND POWER
Arthur M. Squires, 245 W. 104th St.,
New York, N.Y. 10025
Filed June 29, 1966, Ser. No. 561,449
5 Claims. (Cl. 23—213)

ABSTRACT OF THE DISCLOSURE

There is provided an improved process for shifting carbon monoxide over calcined dolomite. Shift is conducted in at least two fluidized beds, the temperature of the final bed being below the equilibrium decomposition temperature of calcium hydroxide at the partial pressure of steam in gas entering the initial bed. Heat developed by shift and recarbonation of CaO is advantageously used to raise or to superheat high pressure steam used in power generation. Calcination of spent solid from shift is conducted in a bed fluidized by air or air-depleted-in-oxygen and supplied with fuel in an amount not appreciably below stoichiometric. The process preferably operates at a pressure higher than 60 p.s.i.a. so that power may be recovered from calcination offgases. The molar steam-to-carbon-monoxide ratio in gas to be shifted is preferably not greater than about 1.2.

Background of the invention

This application is a continuation-in-part of my application Ser. No. 337,900, filed Jan. 15, 1964, now U.S. Patent 3,276,203 (October 1966).

Summary of the invention

This invention relates to the production of hydrogen and power simultaneously, and more particularly to an improved method for producing hydrogen from carbon monoxide and steam through the agency of calcined dolomite.

An object of this invention is to provide a method of great economy for producing hydrogen while simultaneously producing power from steam and high-pressure flue gases.

The use of lime to promote carbon-monoxide-shift was proposed as early as 1880 (U.S. Patent 229,339). This broad idea has received persistent attention without its ever coming into commercial use; a review of the subject is to be found in Schmidt, Das Kohlenoxyd, Akademische Verlagsgesellschaft MBH, Leipzig, 1935. The most highly developed ideas used either a fixed bed of calcined dolomite [Berichte der Gesellschaft für Kohlentechnik, vol. 3 (1930), pp. 211–370] or a moving bed of calcined ankerite, a ferruginous dolomite [U.S. Patents 1,985,441 (1934) and 2,183,301 (1939)]. These proposals suffer at least two serious defects which have worked against their adoption: (1) Removal of heat developed within the bed of solid by the shift reaction is difficult and expensive, and particularly so if one wishes to recover the heat at a high temperature level. (2) Several hundred percent excess air must be used in a combustion to calcine spent solid from the shift reaction, in order to avoid heating the solid to such a high temperature that its reactivity is impaired. The necessity for a large amount of excess air not only lowers the overall thermal efficiency of the operation and increases the size of equipment, but also makes it uneconomic to treat a CO-containing gas which carries more than a small amount of hydrogen sulfide, since sulfur would be converted to calcium sulfate in the calcination step.

The disadvantages of the earlier proposals are substantially overcome in the present invention, according to which there is provided an improved process useful in the production of hydrogen and power, comprising: (a) supplying a pulverulent solid containing intermingled microscopic crystallites of calcium oxide and magnesium oxide to each of at least two fluidized beds; (b) fluidizing a first bed at elevated temperature with a gas containing carbon monoxide and steam; (c) subjecting offgas from the first bed to treatment which includes employment of at least part of the gas to fluidize a second bed at a lower temperature which is below the equilibrium decomposition temperature of calcium hydroxide at the partial pressure of steam in the gas in step (b); (d) withdrawing hydrogen product from the second bed; and (e) withdrawing solid from each of the fluidized beds, and calcining the solid withdrawn from at least one of the beds in a bed fluidized by air or air-depleted-in-oxygen and supplied with a fuel in an amount not appreciably below stoichiometric.

The aforementioned pulverulent solid is advantageously derived by calcining naturally-occurring dolomite rock, a common rock of wide distribution. Its structure resembles that of calcite, i.e., alternating layers of carbonate ions and cations. Ideally, cation planes populated entirely by $Mg^{++}$ alternate with planes populated entirely by $Ca^{++}$. Natural dolomite seldom attains the ideal of one atom of Mg for each atom of Ca, the latter usually being present in excess. When dolomite is calcined, intermingled crystallites of MgO and CaO are formed which have no "memory" of the ordered arrangement of these elements in the dolomite structure. The crystallites are microscopic in size and are highly reactive chemically. MgO and CaO have contrasting and complementary chemical properties. The CaO crystallites are reactive toward $CO_2$ at temperatures above about 600° F.—i.e., they absorb $CO_2$ with formation of crystallites of $CaCO_3$. The MgO crystallites are not reactive toward $CO_2$, but form a rugged, porous structure which can readily be penetrated by $CO_2$; thus substantially all the CaO throughout the solid can be reacted. The CaO can be converted to $CaCO_3$, and then calcined, and the cycle repeated many times with no chemically-induced decrepitation of the solid. Although unreactive toward $CO_2$, the MgO crystallites in calcined dolomite have an important chemical property: at temperatures above about 750° F. they are catalytic for the water-gas shift reaction. Accordingly, calcined dolomite has the power to convert CO to $H_2$ according to the reaction:

where the symbol [CaO+MgO] represents calcined dolomite and [$CaCO_3$+MgO] represents a solid which results from the recarbonation of the CaO crystallites in calcined dolomite.

Artificially-made dolomites are known, differing little from natural dolomites, and calcined products prepared from such materials are satisfactory. An artificial product produced by calcining co-precipitated $CaCO_3$ and $MgCO_3$, preferably in which Mg exceeds Ca on an atomic basis, is satisfactory. The terms [CaO+Mgo] and [$CaCo_3$+MgO] are intended to include solids prepared from artificial as well as natural materials, and are not limited to solids containing Ca and Mg in exactly 1-to-1 atomic ratio.

If a natural dolomite is selected for use in the process of this invention, it should be free of calcite strata. Preferably, the Ca-to-Mg atomic ratio should not be much greater than unity, since stones having a ratio appreciably greater than unity are found to possess less resistance to deactivation by exposure to high temperatures. Stones having Ca in considerable excess will be found to sinter at high temperatures, with loss of reactivity of CaO crystallites toward $CO_2$ and with reduction of MgO's catalytic activity toward CO-shift. Stone from the Greenfield formation of Western Ohio, which has the unusually low Ca-to-Mg atomic ratio of 0.987, is reported to resist deactivation during calcination, and may be calcined repeatedly at 2000° F. without significant loss of reactivity. A stone such as that from the Greenfield formation is preferred.

Attention is directed to the fact that the present invention may not be practiced with combinations of alkaline-earth oxides other than CaO and MgO. Only MgO is sufficiently catalytic toward CO-shift. While strontium and barium oxides absorb $CO_2$ to form carbonates, the temperatures required to decompose these carbonates are so high that MgO, if it were present, would sinter and lose its catalytic powers.

In conducting CO-shift over calcined dolomite, it is preferable to avoid combinations of temperature and steam partial pressure such as to cause the formation of $Ca(OH)_2$, which would bring about decrepitation of the solid.

Conducting CO-shift in a fluidized bed rather than in a fixed bed or a moving bed has the great advantage that heat-transfer surface placed within the fluidized bed displays an unusually high transfer of heat per unit area and per unit temperature drop across the surface. Accordingly, heat can be made available from the CO-shift process with only a small temperature drop, i.e., heat can be made available at a high temperature level, and may be used to generate high-pressure steam from water, or to superheat high-pressure steam. The high-temperature heat may also be used to sustain an endothermic chemical reaction, such as the reforming of hydrocarbons by steam over a catalyst, which is the subject of my co-pending application Ser. No. 433,066, filed Feb. 16, 1965.

A number of advantages can be derived if the process of this invention is conducted at an elevated pressure. Hydrogen product of high purity can be obtained from fluidized beds operating at a higher temperature, thereby rendering the heat recovered from the beds more valuable. The fluidized beds are physically smaller for treating a given quantity of CO-containing gas.

Power may be recovered from the expansion of offgas from the calcination bed through an expansion turbine. In order that this recovery of power take place at good efficiency, it is preferable that the process be conducted at a pressure not less than about 60 pounds per square inch absolute (p.s.i.a.).

With use of power recovery, both from calcination-bed offgas and from high-pressure steam, the process is attractive for use to produce byproduct hydrogen from a power station in which a sulfur-bearing fuel is gasified to produce hydrogen and carbon monoxide, from which sulfur is recovered to supply a clean fuel gas for use in power generation with production of effluents which are not objectionable from an air-pollution standpoint. In this application of the process, there is sometimes an advantage in supplying fuel to the calcination step in a ratio appreciably greater than stoichiometric, so that offgas from the calcination step is a lean fuel gas to be burned elsewhere in the power station.

Conducting CO-shift in at least two fluidized beds is preferable to one bed for two reasons: (1) the fuel requirement in the calcination step can thereby be reduced, and (2) hydrogen product of higher purity can be obtained.

The fuel requirement in the calcination step can be reduced by operating one of the beds at a higher temperature and by supplying partially recarbonated solid only from this bed to the calcination step, thereby reducing the sensible heat which must be supplied to the solid in order to raise its temperature to that of the calcination step. The high-temperature bed would receive partially recarbonated solid from a cooler bed.

Hydrogen product of highest purity can be obtained by operating one of the beds at as low a temperature as possible and by withdrawing hydrogen product from this bed. The temperature must not however be below the temperature at which $Ca(OH)_2$ would form from gases of the composition supplied to the bed.

From the foregoing, it will be seen that providing at least two beds has the advantage that the hotter bed can not only supply hotter solid to a calcination zone but also reduce the partial pressure of steam in the gases undergoing treatment so that a second bed can operate at a much lower temperature than one could use if only one bed were provided. If only one bed is used, the purity of hydrogen product suffers because a higher temperature must be adopted to avoid formation of $Ca(OH)_2$, unless one resorts to the inconvenient and costly expedient of recycling product hydrogen to the bed in order to reduce the steam partial pressure in gases entering the bed.

In principle, hydrogen of the highest purity can be made and the fuel requirement in the calcination step can be the least if a large number of beds is provided, in each of which only a minor fraction of the total CO-shift occurs. In general, however, good results are obtained with use of two or three CO-shift beds.

In selecting an operating pressure and temperature for the CO-shift bed operating at the highest temperature, care must be exercised to avoid a combination of steam partial pressure and temperature which would give rise to formation of a large amount of a eutectic melt including $Ca(OH)_2$, CaO, and $CaCO_3$. In operations at pressures above about 30 atmospheres, it is sometimes preferable to treat the Co-containing gas in the high-temperature CO-shift bed with appreciably less than the stoichiometric amount of steam for the CO which one wishes to shift in the overall process. Additional steam can then be added to the offgas from the high-temperature bed. This measure is particularly advantageous in treating a gas containing a high percentage of CO.

A striking advantage of the new process by comparison with the conventional low-temperature catalytic CO-shift process is that practically complete conversion of CO to $H_2$ can be obtained with use of only a very small amount of steam in excess of the CO to be shifted. Good results are obtained with an initial molar ratio of $H_2O$ to CO of around 1.1, and results may be obtained at an even smaller ratio which are satisfactory for many purposes for which the hydrogen product may be desired. There is seldom an economic incentive to use a molar ratio greater than about 1.2.

Conducting the calcination step without using a great excess of air beyond the stoichiometric amount needed for the fuel not only has the advantage that overall thermal efficiency is higher and equipment is smaller, but also facilitates the shifting of a CO-containing gas which contains $H_2S$. With such a gas, CaS forms in the shift step, and calcination in presence of excess air would convert the CaS to $CaSO_4$. If an amount of air slightly less than the stoichiometric is used, CaS is converted to CaO during calcination with the elimination of sulfur in form of $SO_2$ in the offgas. If still less air is used, CaS is preserved during calcination, and a step may be interposed in the processing sequence in which $H_2S$ is produced from the solid by contacting the solid with steam and $CO_2$ at elevated pressure, in the manner described in my aforementioned application of which this is a continuation-in-part.

Brief description of the drawing

The invention including various novel features will be more fully understood by reference to the accompanying drawing which diagrammatically illustrates apparatus suitable for carrying out the new process.

Description of a preferred embodiment

Vessel 1 houses an upper fluidized bed 2 and a lower fluidized bed 3, both beds consisting of a pulverulent solid substantially comprising intermingled microscopic crystallites of CaO, CaCO₃, and MgO. A pulverulent solid substantially comprising intermingled microscopic crystallites of CaO and MgO is introduced into bed 2 from aerated standpipe 8 via solid-flow-regulating valve 9. Solid is caused to flow from bed 2 to bed 3 through pipe 10 via solid-flow-regulating valve 11. A gas containing $H_2O$, $H_2$, and CO is supplied through line 6 and is the fluidizing gas to bed 3, which operates 1500° F. and 580 p.s.i.a., say. A major part of CO entering bed 3 is converted to $H_2$, and offgas from bed 3 is the fluidizing gas to bed 2. Disengaging space 23 is provided to minimize recirculation of solid from bed 3 to 2. Gas enters bed 2 across grid-plate 22. Bed 2 operates at 1100° F. and 570 p.s.i.a., say, to produce hydrogen of high purity, withdrawn through line 7. Heat is removed from beds 2 and 3 via heat-transfer surfaces 4 and 5 housed in the respective beds. The heat may advantageously be used to raise or to superheat steam at 2500 p.s.i.a., say, which may be employed as a power-generating fluid.

Solid is withdrawn from bed 3 through aerated standpipe 12, and is supplied across solid-flow-regulating valve 13 to fluidized bed 15 housed in vessel 14. Air or air-depleted-in oxygen is supplied to vessel 14 through line 16 and serves as the fluidizing gas to bed 15. Fuel (natural gas, say) is supplied through line 17 and enters bed 15 through nozzles 18. The fuel is preferably supplied in an amount not significantly less than that which is stoichiometrically required to react with oxygen in the air or air-depleted-in-oxygen. Bed 15 operates at 580 p.s.i.a., say, and at a temperature at which the equilibrium decomposition pressure of $CaCO_3$ exceeds the partial pressure of $CO_2$ established in offgas from bed 15 by $CO_2$ from the decomposition of substantially all $CaCO_3$ entering bed 15 from standpipe 12 combined with $CO_2$ from the combustion of the fuel.

Gaseous effluent from bed 15 is a flue gas, if fuel is supplied in substantially the stoichometric amount, or is a lean fuel gas, if fuel is supplied in appreciably greater than the stoichiometric amount, as is sometimes advantageous. The effluent conveys solid from bed 15 in dilute-phase transport upward through line 19 into cyclone-solid-gas-separator 20, which delivers most of the solid to standpipe 8. Flue gas or lean fuel gas leaves cyclone-separator 20 through line 21, and is conveyed to power-recovery equipment (not shown in the drawing).

In an example of the process conducted in the apparatus of the drawing, bed 2 was operated at 570 p.s.i.a. and 1100° F., and bed 3 was operated at 1500° F. Gas entering bed 3 had the following composition: 46.30 mole percent $H_2$, 25.05% CO, 0.99% $CO_2$, and 27.66% $H_2O$.

Notice that the molar $H_2O/CO$ ratio in this gas is only about 1.1. Product hydrogen from bed 2 analyzed 96.29% $H_2$, 0.10% CO, 0.01% $CO_2$, and 3.60% $H_2O$. Notice the outstandingly small content of carbon oxides in the product, and also that only a small amount of water must be condensed if dry $H_2$ is required.

As mentioned previously, more CO-shift beds than the two shown in the drawing may be used with advantage, and one may sometimes prefer to add a part of the steam to offgas from bed 3 rather than to add all of the steam ahead of bed 3.

The fluidized beds 2 and 3 in the drawing are separated by grid-plate 22 and plenum space 23. This is the preferred arrangement, but satisfactory results are obtained if the beds are separated by a zone of so-called "hindered fluidization", such as may be created if a zone of vessel 1 contains a packing like raschig rings or spheres, or such as may be created through extensive baffling of a zone of vessel 1. It is well known that one can use a zone of packing or baffling to establish a large temperature difference between a bed of freely fluidized solid above the zone and a second bed below. Such beds are considered distinct and separate fluidized beds in the terminology of this application.

I do not wish my invention to be limited to the particular embodiment of the accompanying drawing. Those skilled in the art will recognize other arrangements differing from my example only in detail, not in spirit. Only such limitations should be imposed as are indicated in the appended claims.

I claim:
1. An improved process useful in the production of hydrogen and power, comprising:
   (a) supplying a pulverulent solid containing intermingled microscopic crystallites of calcium oxide and magnesium oxide to each of at least two fluidized beds;
   (b) fluidizing a first bed at elevated temperature with a gas containing carbon monoxide and steam;
   (c) subjecting offgas from said first bed to treatment which includes the employment of at least part of said gas to fluidize a second bed at a lower temperature which is below the equilibrium decomposition temperature of calcium hydroxide at the partial pressure of steam in said gas in step (b);
   (d) withdrawing hydrogen product from said second bed; and
   (e) withdrawing solid from each of said fluidized beds, and calcining the solid withdrawn from at least one of the beds in a bed fluidized by air or air-depleted-in-oxygen and supplied with a fuel.

2. The process of claim 1 in which also said fuel is supplied in an amount not appreciably less than the quantity required for stoichiometric combustion of all oxygen contained in said air or said air-depleted-in-oxygen.

3. The process of claim 1 including the step of recovering heat from said fluidized beds in step (a) by indirect exchange of heat to water or steam at high pressure.

4. The process of claim 1 in which also each of said fluidized beds in step (a) and step (e) operates at a pressure not below about 60 p.s.i.a.

5. The process of claim 1 in which also the molar steam-to-carbon-monoxide ratio of said gas in step (b) is not greater than about 1.2.

References Cited

UNITED STATES PATENTS

| | | | |
|---|---|---|---|
| 2,557,680 | 6/1951 | Odell | 201—12 |
| 2,759,799 | 8/1951 | Berg | 23—213 |

CARLTON R. CROYLE, *Primary Examiner.*